United States Patent
Öttinger et al.

(10) Patent No.: US 6,645,456 B2
(45) Date of Patent: Nov. 11, 2003

(54) METHOD FOR PRODUCING EXPANDABLE GRAPHITE INTERCALATION COMPOUNDS USING PHOSPHORIC ACIDS, AND GRAPHITE FOIL

(75) Inventors: Oswin Öttinger, Meitingen (DE); Hubert Malik, Ellgau (DE)

(73) Assignee: SGL Technik GmbH, Meitingen (DE)

( * ) Notice: Subject to any disclaimer, the term of this patent is extended or adjusted under 35 U.S.C. 154(b) by 101 days.

(21) Appl. No.: 09/770,716

(22) Filed: Jan. 25, 2001

(65) Prior Publication Data

US 2001/0018040 A1 Aug. 30, 2001

(30) Foreign Application Priority Data

Jan. 29, 2000 (DE) .......................................... 100 03 927

(51) Int. Cl.$^7$ ................................................. C01B 31/04
(52) U.S. Cl. ........................................ 423/448; 423/460
(58) Field of Search ................................ 423/414, 439, 423/448, 460

(56) References Cited

U.S. PATENT DOCUMENTS

| | | | |
|---|---|---|---|
| 3,333,941 A | 8/1967 | Olstowski ....................... 71/39 |
| 3,404,061 A | 10/1968 | Shane et al. ................. 428/143 |
| 3,526,482 A | * 9/1970 | Beltz et al. .................. 422/202 |
| 4,091,083 A | 5/1978 | Hirschvogel et al. ....... 423/415 |
| 4,146,401 A | * 3/1979 | Yamada et al. ............. 264/105 |
| 4,895,713 A | 1/1990 | Greinke et al. ............. 423/448 |

FOREIGN PATENT DOCUMENTS

| | | |
|---|---|---|
| EP | 0 085 121 B1 | 6/1985 |
| EP | 0 305 984 A2 | 3/1989 |
| EP | 0 794 229 A2 | 9/1997 |
| GB | 1 504 841 | 3/1978 |
| JP | 10330108 A | * 12/1998 |

OTHER PUBLICATIONS

Wenbin Wu et al.: "Preparation of low sulfur expanded graphite", Chemical Abstracts, vol. 132, No. 3, 2000, p. 702, Ref. 24409k.
W.C. Forsman et al.: "Chemistry Of Graphite Intercalation By Nitric Acid", Carbon, vol. 16, 1978, pp. 269–271.

* cited by examiner

Primary Examiner—Stuart L. Hendrickson
Assistant Examiner—Peter J Lish
(74) Attorney, Agent, or Firm—Laurence A. Greenberg; Werner H. Stemer; Gregory L. Mayback

(57) ABSTRACT

A method for producing expandable graphite intercalation compounds uses a thermal polyphosphoric acid which is added to an intercalation agent or to graphite. Preferably, the thermal polyphosphoric acid is used in a mixture with red, fuming nitric acid. Products produced from the graphite intercalation compounds through the expanded graphite stage, such as graphite foils, graphite laminates or graphite seals, have a comparatively high fluid tightness, are relatively resistant to oxidative attack, and can have comparatively high strengths. A further advantage is a good handling ability of the thermal polyphosphoric acids. A graphite foil is also provided.

39 Claims, No Drawings

METHOD FOR PRODUCING EXPANDABLE GRAPHITE INTERCALATION COMPOUNDS USING PHOSPHORIC ACIDS, AND GRAPHITE FOIL

BACKGROUND OF THE INVENTION

Field of the Invention

The invention relates to a method for producing expandable graphite intercalation compounds by reacting crystalline graphite particles having a laminar structure with an intercalation agent which contains a strong protonic acid, an oxidizing agent and a phosphoric acid. The graphite intercalation compounds can be used to produce expanded graphite and to form graphite foils, graphite laminates and graphite seals. The invention also relates to a graphite foil providing an improved fluid tight graphite seal.

Graphite intercalation compounds in which the graphite is a carrier of positive charges and anions are intercalated between layer planes of a crystal lattice of the graphite have become increasingly more significant technically over the last 25 years because of their capacity to expand when heat is supplied. Graphite bisulphates and graphite nitrates in particular are important starting products for producing expanded graphite, or graphite expandate, which is in turn processed further by compression to form molded bodies of a wide variety of types, in particular plates and foils. A plurality of products for sealing technology, such as flat seals, stuffing box packings or spherical cap seals, are produced among other items, from plates and foils of that type, as well as directly from graphite expandate. In addition to optimizing the properties of sealing materials such as resilience behavior, chemical resistance, sliding properties or the prevention of corrosion on the sealing surfaces, because of the continuously increasing demands on sealing materials for reasons of environmental protection and the protection of health and safety standards at work, attempts have been made to minimize the permeability of sealing materials and to increase their strength. The improvement of the oxidation stability is an additional target for high-temperature uses. A key to pursuing those targets lies in the manner of producing the starting product, namely the graphite intercalation compound.

According to known methods for producing sealing materials, good crystalline flake graphite is reacted with a mixture of concentrated sulfuric acid and nitric acid, with fuming nitric acid (U.S. Pat. No. 3,404,061), or with a mixture of hydrogen peroxide and concentrated sulfuric acid (U.S. Pat. No. 4,091,083). Excess acid is removed by washing with water and a graphite salt which is obtained in that way is expanded by rapid heating to temperatures of more than 800° C., after a drying step. The expandate, which has a very low bulk weight, is then processed further to form sealing materials or other products. According to another method (U.S. Pat. No. 4,895,713), the process is carried out as anhydrously as possible with such a small amount of intercalation agent that the reaction mixture does not have an excess of liquid and the graphite intercalation compound no longer has to be washed but can instead be expanded directly. A phosphate or phosphoric acid can be added to the reaction mixture in order to improve the oxidation stability of the products produced from the graphite expandate. A disadvantage of the above-mentioned methods is that, despite the use of mainly concentrated acids in the intercalation mixture, generally substantial amounts of water are always present. It is known that salt-type graphite intercalation compounds are hydrolyzed by water. Therefore, if water is present in the reaction mixture, the largest possible intercalation effect cannot be achieved. The structure of the graphite expandate produced from the graphite intercalation compound obtained in that way is admittedly quite good, but is still not optimal. Graphite intercalation compounds produced in accordance with U.S. Pat. No. 3,333,941 do not have an optimal structure either. According to the method which is taught therein, it is possible to work with both very small amounts and very large amounts of intercalation agents (range: 0.25 to 4 g intercalation agent to 1 g graphite). A fundamental characteristic of that method, however, is the addition of phosphorus pentoxide to the intercalation mixture in amounts of 2 to 500 percent by weight with respect to the amount of graphite being used. Washing with water must not take place after the end of the intercalation reaction. An addition of phosphoric acid to the reaction mixture is ineffective. However, it was not the aim of the invention to produce graphite intercalation compounds having a great expanding capacity. The products obtained according to that method are intended for use as mulch in farming, as flame-retardant additives or as pH-value-regulating measures. They could not, therefore be used for the production of high-grade sealing materials. The expansion factor of those graphite intercalation compounds, which is at 1 to a maximum of 200, is accordingly comparatively low. Tests have shown that a serious, practical problem when working according to that method is the handling of the phosphorus pentoxide and the working with that substance. Apart from dusting with the aggressive powder all at once, it cannot be mixed-in homogeneously, or it can only be mixed-in homogeneously with difficulty, particularly when only working with small amounts of intercalation liquid. The mixture heats up and lumps start to form even when mixing phosphorus pentoxide with natural graphite. That happens even if phosphorus pentoxide is mixed with a reaction mixture made up of liquid intercalation agent and natural graphite. Such a coalesced reaction mixture is difficult to handle. An addition of water, which could solve that problem, is counter-productive, because it results in the reaction mixture heating up further and uncontrollably and the actual aim of working as anhydrously as possible is ruined.

SUMMARY OF THE INVENTION

It is accordingly an object of the invention to provide a method for producing expandable graphite intercalation compounds using phosphoric acids, and a graphite foil, which overcome the hereinafore-mentioned disadvantages of the heretofore-known methods and products of this general type.

Therefore, it is an object of the invention to develop a method for producing salt-type graphite intercalation compounds. In this method, graphite intercalation compounds can be produced with small amounts of intercalation agents and a substantial exclusion of water, which have a very great expansion capacity and which, moreover, have a phosphorus content that gives the products produced from the graphite intercalation compound through the stage of the graphite expandate a high level of fluid tightness, high oxidation stability and an improved strength property. It is noted that the term "fluids" as used herein refers to both liquid and gaseous media.

Another object of the invention was to achieve this target while using as small an amount of intercalation agent as possible.

Furthermore, it was an object of the invention to make available an expanded graphite which is suitable for producing products such as graphite foils, graphite laminates, graphite gaskets, graphite packings, graphite packing rings and graphite packing yarns. The underlying object of the invention was, furthermore, to develop a graphite seal having excellent fluid tightness.

With the foregoing and other objects in view there is provided, in accordance with the invention, a method for producing an expandable graphite intercalation compound, which comprises reacting crystalline graphite particles having a laminar structure, in a temperature range from −10° C. to +80° C., without an additional supply of water, with a reaction mixture formed of at least one strong concentrated acid, an oxidizing agent for oxidizing the graphite, and a thermal polyphosphoric acid.

All naturally occurring or synthetically obtained grades of graphite that have a laminar or plate-like structure can be used for the production of the graphite intercalation compounds. Sulfuric acid in concentrations from 90% by weight, nitric acid in concentrations from 60% by weight, or phosphoric acid in concentrations from 80% by weight, can be used as the strong acid, the anions of which become bound between the layer planes of the graphite lattice during the intercalation process. Mixtures of the above-mentioned acids can also be used. Preferably, concentrated sulfuric acid is used and particularly preferably red, fuming nitric acid.

All substances known from the prior art can be used as the oxidizing agent. Preferably, concentrated nitric acid, hydrogen peroxide or peroxosulphuric acid are used. These acids are preferably used in a mixture with concentrated sulfuric acid as the intercalation agent. Particularly preferably, red, fuming nitric acid is used. An advantage of this procedure lies in the fact that the red, fuming nitric acid acts, on one hand, as an oxidizing agent and, on the other hand, as an intercalation agent, the anion of which is preferably intercalated between the layer planes of the graphite.

A feature which is essential to the invention is that the reaction mixture contains a thermal polyphosphoric acid. Preferably, thermal polyphosphoric acids having a calculated content of phosphorus pentoxide of greater than or equal to 76% by weight or of greater than or equal to 84% by weight are used. The decision as to which acid concentration is used depends on the respective conditions. Thermal polyphosphoric acids are produced by absorbing phosphorus pentoxide in diluted phosphoric acid. Although their concentration is indicated with the aid of a calculated content of phosphorus pentoxide, they do not contain any phosphorus pentoxide. Instead, depending on the concentration, they contain varying amounts of highly condensed phosphoric acids in a mixture of the general formula $H_{(n+2)}P_nO_{(3n+1)}$, called polyphosphoric acids. Such polyphosphoric acids are obtainable in the chemical trade. The use of the polyphosphoric acids in the present invention has the following fundamental advantages: the polyphosphoric acids act hygroscopically and impart to the graphite products produced when using them a comparatively high oxidation stability, a comparatively low permeability to fluids and a comparatively great strength. As a result of their hygroscopic action, they absorb water present in the reaction mixture and/or bind water produced during the course of the reaction. The reaction mixture therefore always has a minimum water content. The hydrolysis of the resulting graphite intercalation compounds is suppressed as a result and optimum intercalation is achieved. The latter is a prerequisite for a good expansion capacity of the graphite intercalation compounds produced in this way and for a good structure of the graphite expandate produced therefrom. It follows from the above that even after the ending of the intercalation reaction, the graphite intercalation compound obtained according to the method may only be isolated, but not brought into contact with water. In contrast to phosphorus pentoxide, the polyphosphoric acids are present in liquid form and can therefore be handled without difficulty, which is of particular significance for carrying out the method on a large scale. Apart from this, they can be added to the graphite, the acids or acid mixtures and the reaction mixture at any time, without a detrimental temperature rise taking place. It is advantageous to add the polyphosphoric acid before the start of the intercalation reaction or before mixing the reactants with the natural graphite.

For reasons of simplification, when necessary, the technical term "thermal polyphosphoric acid" or "polyphosphoric acid" is used in the singular in the following and in the claims, although in each case one is concerned with mixtures of a plurality of condensed phosphoric acids.

The amount of polyphosphoric acid being added can vary within wide limits. It lies in the range from 1:0.002 to 1:1 parts by weight, with respect to the sum of the acid intended for intercalation and the oxidizing agent being equal to 1. For most practical cases, however, an admixture ratio of 1:0.005 to 1:0.1 parts by weight is sufficient. According to a preferred variant of the invention, an admixture ratio of 1:0.005 to 1:0.03 parts by weight is used.

The quantity of liquids used for the reaction with the graphite and formed of the intercalation agent, the oxidizing agent and the polyphosphoric acid lies in the range from 10 to 200 parts by weight of liquid to 100 parts by weight of graphite. The decision as to how much liquid is used in the individual case depends on the conditions of the individual case and is decided in each case by the person of skill. In general, however, for reasons of process economy and environmental protection, it is advantageous to work with as little liquid as possible, i.e. in the range from 10 to 50 parts by weight of liquid to 100 parts by weight of graphite. In the latter case, the reaction product can be stored without further intermediate steps or treatment or expanded directly. If, however, it is necessary to work with larger amounts of liquid, the excess of reaction liquid is separated from the intercalation compound after the end of the intercalation reaction according to one of the known methods, and the intercalation compound obtained in this way is stored temporarily or processed further. The graphite intercalation compounds obtained in this way have an excellent expansion capacity. It lies at least at 1 to 200, i.e. a one $cm^3$ intercalation compound obtained by pouring takes on a volume of at least 200 $cm^3$ after the expanding. In most cases, expansion factors of approximately 1 to 300 are achieved. The expanding takes place at the fastest rate by applying high temperatures to the graphite intercalation compound. According to one of the known methods, it can be carried out, for example, by blowing the intercalation compound through the flame of a burner or by directing the intercalation compound through a tube heated to the predetermined temperature. In the case of expanding at a temperature of 500° C., only average degrees of expansion are obtained. The expansion potential of the intercalation compound is not fully exhausted in this case. Nevertheless, temperatures in this comparatively low range can be used if graphite expandates with high bulk weights, for example for the production of comparatively thick parts, such as plates, are required, or if foils, plates or laminates produced therefrom are to have a high compressive strength. In the case of correspondingly high compression ratios, products produced in this way also have very low leakage values. Preferably, however, temperatures of at least 800° C., particularly preferably temperatures from 1000° C. and above, are used during expanding. At these temperatures, the expansion potential of the graphite intercalation compounds is fully exhausted and expandates having a bulk weight of 3 g/l or less are obtained.

According to an advantageous variant of the invention, the liquid phase in the reaction mixture is formed of highly concentrated nitric acid of at least 80% by weight and of thermal polyphosphoric acid. The nitric acid in this case serves both as an oxidizing agent and as an intercalation agent. Preferably in this variant, red, fuming nitric acid is used. This intercalation reaction can only take place satisfactorily in dry media. That is because for the course of the reaction the nitronium ion $NO_2^+$ has to be formed from nitric acid, releasing water. The nitronium ion oxidizes the graphite and prepares it for the intercalation of nitrate and phosphate ions (see the publication Carbon, Vol. 16, 1978, p. 269–271). If water is present, this reaction is shifted to the side of the nitric acid and too few nitronium ions are available. It is a fundamental advantage of the invention to have made the thermal polyphosphoric acids available for this reaction as a water-binding agent. The reaction can only be carried out on a large scale as a result of this, because, as explained above, working with phosphorus pentoxide is linked with practical difficulties which are too great and, as our own practical tests and the above-mentioned U.S. Pat. No. 3,333,941 shows, leads to unsatisfactory results. A further great advantage of the use of thermal polyphosphoric acid lies in that it can be mixed with nitric acid substantially without any rise in temperature, in contrast to phosphorus pentoxide. This also has a positive effect on the course of the reaction, because the intercalation compounds which result in the reaction mixture can release part of the intercalated substances again if there is too great a temperature increase, with the result that their expansion capacity is reduced. On the contrary, an addition of phosphorus pentoxide to nitric acid leads to a strong temperature increase, as a result of which, in addition to the above-described negative effect, nitrous gases are released to a considerable extent and can then no longer be used for the intercalation reaction. It is vital that the polyphosphoric acid has a sufficiently large content of condensed phosphoric acids of the general formula $H_{(n+2)}P_nO_{(3n+1)}$. These are all able to absorb water and support the intercalation reaction as described above. The latter is particularly significant if a polyphosphoric acid having a calculated content of 84% by weight phosphorus pentoxide is used. When this type of acid is used, should this be possible, it is also possible to work with a comparatively small added amount of thermal polyphosphoric acid.

However, it is also possible to work with thermal polyphosphoric acids which have a lower calculated content of phosphorus pentoxide. The use of such types of acid is sensible if comparatively small amounts of water have to be bound or if it is the aim to add a lot of phosphate to the reaction mixture. When proceeding in this way, it is possibly necessary to work with a larger amount of polyphosphoric acid if it is necessary to ensure that the reaction mixture has a sufficient capacity to absorb water. An example of an acid type of this kind is a thermal polyphosphoric acid having a calculated phosphorus pentoxide content of 76% by weight.

The added amount of thermal polyphosphoric acid can lie in a range from 1 part by weight of nitric acid to 0.002 parts by weight of polyphosphoric acid to 1 part by weight of nitric acid to 1.0 parts by weight of polyphosphoric acid. According to a preferred version, the added amount of thermal polyphosphoric acid lies in the range from 1 part by weight of nitric acid to 0.005 parts by weight of polyphosphoric acid to up to 1 part of nitric acid to 0.25 parts of polyphosphoric acid. According to a further preferred version, the added amount of thermal polyphosphoric acid lies in the range from 1 part by weight of nitric acid to 0.005 parts by weight of polyphosphoric acid to up to 1 part by weight of nitric acid to 0.1 parts by weight of polyphosphoric acid. According to a particularly preferred variant of the invention, there is added to the reaction mixture a mixture of nitric acid and thermal polyphosphoric acid that lies in the range from 1 part by weight of nitric acid to 0.005 parts by weight of polyphosphoric acid to up to 1 part by weight of nitric acid to 0.03 parts by weight of polyphosphoric acid.

The liquid phase which is used for the intercalation reaction and which is basically formed of the nitric acid and the thermal polyphosphoric acid is applied in a mixing ratio which lies in the range from 100 parts by weight of graphite to 10 to 200 parts by weight of liquid phase. According to a variant of the method that is preferred for reasons of process economy and environmental protection, a mixing ratio in the range from 100 parts by weight of graphite to 20 to 50 parts by weight of liquid phase is used. Apart from the substances described herein, constituents of the reaction mixture can also be admixtures which are known per se, such as molybdenum compounds for example, that influence or improve the quality of the end products. If amounts of more than 50 parts by weight of liquid phase are added to the graphite for reacting, it is sensible in most cases to separate the excess liquid through the use of one of the known methods after the end of the reaction, and to subsequently further process the graphite intercalation compound obtained in this way. In most cases, the next processing step is the expanding, which is carried out according to one of the known methods at temperatures of at least 500° C. If the expansion capacity of the graphite intercalation compound is to be exhausted fully, it is necessary to work with expansion temperatures of at least 800° C. and preferably of at least 1000° C. An expanded graphite with a bulk weight of at most 3 g/l is then obtained. In the case of an optimal course of the reaction, the bulk weights are around 2 g/l, despite the phosphate content which remains.

The graphite expandates produced from the graphite intercalation compounds can be processed further to form a plurality of products. These are, among others, basically graphite foils, graphite laminates and graphite sheets. The last three products can, for example, be used for purposes of the generation of heat through the use of the Joulean principle, for the purpose of heat conduction or as a heat shield. Their main usage, however, lies in the production of a very wide variety of sealing materials and above all flat gaskets, packing rings and packing yarns. Materials produced according to the method of the invention, and thus also the seals, have a very good oxidation stability and very low permeability values for fluids. Apart from this, they have good strength values, with it being possible for materials having either improved compressive strength or improved tensile strength to be produced. The other outstanding properties of products produced from expanded graphite, such as resistance to high temperatures or corrosion resistance, are not impaired by the new production method.

With the objects of the invention in view, there is also provided a special variant, in which the reaction mixture contains at least 10 parts by weight of thermal polyphosphoric acid, with respect to 1 part by weight of one of the other above-mentioned acids or an acid mixture which can be produced therefrom, and in which the graphite intercalation compound that is obtained is expanded at a temperature of at least 800° C. Sealing foils or sealing laminates which are obtained after compression have a gas permeability according to DIN 28090-1 (preliminary test) for nitrogen, with respect to a weight per unit area of 2000 g/m², of less than or equal to 0.06 mg/(m·s). Such a low permeability value is unusual for graphite seals which are not specially impregnated or, for example, reinforced with a metal insert, and until now has not been achieved on a large or commercial scale.

Other features which are considered as characteristic for the invention are set forth in the appended claims.

Although the invention is described herein as embodied in a method for producing expandable graphite intercalation compounds using phosphoric acids and a graphite foil, it is nevertheless not intended to be limited to the details provided, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENTS

EXAMPLE 1

In a first partial test, 10 g of phosphorus pentoxide were placed in a multi-neck flask having a stirrer, a dosing vessel for red, fuming nitric acid, an internal thermometer and a gas outlet. Then, while stirring, 30 g of nitric acid with an $HNO_3$ content of 100% by weight were added drop by drop within 5 minutes. Before mixing, both substances had a temperature of 28° C. Immediately after the start of the addition, the nitric acid began to boil and a brisk development of nitrous gases began. These gases were escaping from the vessel through the vent line. The development of nitrous gases lasted for the entire duration of the addition of nitric acid and did not stop until after the cooling of the reaction mixture began. It was only after a further period of 15 minutes, during which the mixture was stirred intensively, that no agglomerates or portions of phosphorus pentoxide could be seen, with only a few streaks being visible instead.

In a second partial test, 10 g of thermal polyphosphoric acid having a calculated phosphorus pentoxide content of 84% by weight were placed in the multi-neck flask and during the same time as in the first partial test, 30 g of nitric acid of the same concentration as in the first partial test were added drop by drop to this polyphosphoric acid. The thermal polyphosphoric acid had a viscous consistency. The starting temperature of both liquids was 27° C. During, and at the end of, adding the nitric acid to the phosphoric acid, no temperature increase occurred in the mixture. The nitric acid mixed readily with the thermal polyphosphoric acid despite the viscous consistency of the latter. After a further five minutes' stirring time, the mixture was completely clear and free of streaks. The weak development of nitrous gases that was observed corresponded to the amount which is usual for red, fuming nitric acid if the latter comes into contact with ambient air. The thermal polyphosphoric acids used for this test and the tests described in the following were obtained from the company Clariant, Werk Knapsack, Germany.

In a third partial test, 20 g of the mixture produced according to the second partial test, formed of 10 parts by weight of thermal polyphosphoric acid having a calculated content of phosphorus pentoxide of 84% by weight and 30 parts by weight of nitric acid, were mixed carefully while stirring for five minutes at 23° C. with 50 g of flake graphite (grade 2901, supplier Superior Graphite, Chicago) in a glass container having a flat base and a fitting lid portion which had leadthroughs for a stirrer and the dosing vessel for the liquids as well as a gas outlet. The acid mixture could readily be evenly distributed in the graphite. The temperature, moreover, rose to 27° C. After that five minutes, the resulting graphite intercalation compound was removed and expanded in air at 800° C. In order to do this, using a spatula, the intercalation compound was placed in a quartz dish which had been heated to expansion temperature, and immediately after this, the dish with the contents was placed for a further three minutes in a furnace heated to 800° C. The resulting expanded graphite had a well structured, vermicular shape formed of thin, separated small flakes with a bulk weight of 1.9 g/l. The bulk weight was determined by loosely piling the graphite expandate into a 500 ml measuring cylinder and establishing the weight of the volume of the poured-in graphite expandate that was read off from the measuring cylinder. A corresponding amount of graphite expandate was then pre-compressed in a 90 mm-diameter steel tube through the use of a pressure piston to form a pre-pressed part. After removal from the pre-pressing device, the pre-pressed part was heated in a muffle furnace at 800° C. for approximately 20 seconds and then compressed in a die on a stamping press under a pressure of approximately 1.5 N/mm². After a renewed heating step, the foil was finally compressed in the stamping press to a thickness of 1 mm. For improved comparison reasons, the amount of graphite expandate used herein as well as in the tests described in the following was chosen in such a way that a foil having an bulk density of 1.0 g/cm³ and a thickness of 1 mm resulted. This foil had a compressive strength of 154 MPa. The measuring process for determining the compressive strength is described under Example 2.

In a fourth partial test, 5 g of phosphorus pentoxide were mixed with 50 g of natural graphite of the same quality as in the third partial test in a testing configuration as described with regard to the third partial test, for 5 minutes. During mixing, the material heats up strongly and lumps form which cannot be dissolved by mixing, so that it is necessary to start from an uneven distribution of the phosphorus pentoxide through the mixed material. While stirring continuously, 15 g of nitric acid with an $HNO_3$ content of 100% by weight were then added to the mixture of graphite and phosphorus pentoxide, and the mixture was stirred for 5 minutes. This addition was accompanied by a strong development of nitrous gases. The graphite salt produced in this way was, as described in the third partial test, expanded at 800° C. and the graphite expandate obtained as a result was processed to form a 1 mm thick graphite foil having a bulk density of 1.0 g/cm³. The expanded graphite had a bulk density of 2.2 g/l and the graphite foil had a compressive strength of only 132 MPa.

With an overall satisfactory structure, the expanded graphite displayed non-homogeneities as a result of particles which did not expand fully. Flaws were also established in the graphite foil, which were to be attributed to the binding-in and pressing-in of particles of the intercalation compound that had not expanded fully. Such flaws cannot be tolerated for a high-quality graphite foil.

The first, second, third and fourth partial tests of Example 1 show that working with phosphorus pentoxide entails considerable technical difficulties and that therefore, only graphite intercalation compounds, expanded graphite and graphite foils or plates of moderate quality can be produced therewith. However, the advantages of the use of thermal polyphosphoric acid are also already clear from these partial tests. These are established further by the following examples.

EXAMPLE 2

In this example, the influence of the content of different amounts of thermal polyphosphoric acid in the reaction mixture when producing graphite intercalation compounds using red, fuming nitric acid was examined.

Table 1 provides information about the distribution of the proportions of reactants in the partial tests:

TABLE 1

Proportions of the reactants when using red, fuming nitric acid as intercalation agent and oxidizing agent

| Liquid proportions of the reaction mixture | | | ratio of natural |
|---|---|---|---|
| $HNO_3$ (parts by weight) | PPS (parts by weight) | Concentration of PPS (%) | graphite to liquid content (parts by weight) |
| 40 | 0 | 0 | 100/40 |
| 39.6 | 0.4 | 1 | 100/40 |
| 38 | 2 | 5 | 100/40 |
| 30 | 10 | 25 | 100/40 |

PPS = thermal polyphosphoric acid

The reactants were reacted, as described under Example 1, third partial test, and, as described there, expandate was produced from the graphite intercalation compound, and a graphite foil being 1 mm thick and having a bulk density of 1 g/cm$^3$ was produced from the expandate. Grade 2901 graphite from the company Superior Graphite, Chicago, Ill. was used as the natural graphite.

Table 2 reproduces characteristic values established for the graphite expandate and the foil obtained therefrom:

TABLE 2

| Composition of the liquid phase (parts by weight) | natural graphite/ acid mixture (parts by weight) | Bulk weight of expandate (g/l) | characteristic data of the graphite foil | | |
|---|---|---|---|---|---|
| | | | leakage (mg/ (s · m)) | mass loss (600° C.) (%/h) | tensile strength (N/mm$^2$) |
| 100 parts $HNO_3$ | 100/40 | 2.9 | 0.124 | 1.81 | 3.02 |
| 0.4 P PPS/39.6 P $HNO_3$ | 100/40 | 2.4 | 0.082 | 0.6 | 3.24 |
| 2 P PPS/38 P $HNO_3$ | 100/40 | 2.1 | 0.073 | 0.6 | 3.56 |
| 10 P PPS/30 P $HNO_3$ | 100/40 | 1.9 | 0.038 | 1.45/0.6 | 3.71 |
| 2 P PPS/38 P $HNO_3$ | 100/25 | 4.0 | 0.105 | 0.37 | 2.42 |
| 2 P PPS/38 P $HNO_3$ | 100/50 | 2.3 | 0.096 | 0.78 | 3.42 |

PPS = thermal polyphosphoric acid
P = parts by weight

The methods for determining the measurement data are explained in the following. These methods were carried out in the context of the examples described herein. The method for establishing the bulk density of the expandate was already presented under the third partial test of Example 1. The leakage measurements were carried out in dependence on DIN 28090-1 (preliminary test) with flat seals having the dimensions of an internal diameter of 50 mm and an external diameter of 90 mm. The thickness of the seal before the start of the leakage measurement was 1 mm and the internal pressure of the testing apparatus was 40 bar. Nitrogen was used as the test gas.

The material loss as a measure of the resistance to oxidative attack was determined through the use of a tube furnace, the internal diameter of which was 7 cm. A graphite sample with a diameter of 50 mm was positioned perpendicularly with its narrow side in the direction of the longitudinal axis of the furnace in the center of the tube, which had been heated to a temperature of 600° C., and was then exposed to an air flow of 100 l/hour for 2 hours. Half of the weight loss, determined by weighing, that the graphite sample taken from the tube had after cooling, was used as a standard value for the material loss.

The compressive strength of the graphite products produced from the expanded graphite was determined in dependence on DIN 28090 using sealing rings having an internal diameter of 55 mm and an external diameter of 75 mm. In this case as well, the thickness of the seal before the start of measuring was 1 mm.

Tensile strength was established using tensile-test specimens of graphite foil having a width of 10 mm and a free clamping length of 50 mm in a single-spindle tensile testing machine of the type Zwicki Z 2.5 of the company Zwick, located in Ulm, Germany. In this connection, the pulling-off speed was 1 mm/minute.

The measured values of the first four lines of Table 2 show that as a result of the addition of thermal polyphosphoric acid to nitric acid during the intercalation process, considerable improvements in the tightness and the resistance of the foils to oxidation are achieved. The leakage values fall with increasing amounts of added polyphosphoric acid. The comparatively high value for the material loss of 1.45%/h in line 4 of Table 2 is, as additional tests have shown, to be attributed to the fact that during the expanding of the graphite salt, the volatile phosphorus compounds, which were absorbed during the intercalation process, were not fully evaporated and removed. Follow-up tests, in which the expanding took place at higher temperatures, i.e. temperatures of up to 1000° C., or in which the starting products for the foils were heated for a longer time at 800° C., produced values for the mass loss of 0.6%/hour. The bulk weight also decreases in comparison with the control sample to values in the range of 2 g/l. This signifies an improved expansion capacity of the respective graphite intercalation compound and a looser graphite expandate which interlocks better upon compression to form molded bodies. Advantageously, the tensile strength of the graphite foils increases to the extent to which the bulk weight of the expandate falls. In this case, the compressive strengths, which are not listed in Table 2, do not undergo any significant change because of the addition of the polyphosphoric acid. They lie in the region of 145 MPa for the control samples and test samples.

When including the measured values of lines five and six of Table 2, it is evident that even when the amount of intercalation agent added to the graphite is varied, the leakage values and the mass loss values are improved. In the variant with an added amount of intercalation agent of 25 parts by weight, the tensile strength has fallen, which is in accordance with the comparatively high bulk density. At 145 MPa, the compressive strength (not given in the Table) lies in the usual range of the control sample. In the variant with the increased added amount of intercalation agent, a tensile strength which is improved in comparison with the control sample is again found, also in accordance with the good value for the bulk density of the expandate. In this sample, at 137 MPa, the compressive strength (which is not given in the Table) lies in the lower range of the values for the control sample. From the above, it can be seen that when the skilled person applies the teaching of the invention, he or she can produce graphite bodies, in particular graphite foils and plates, having considerably improved properties, from graphite intercalation compounds which were produced by using nitric acid and thermal polyphosphoric acid. In this connection, it is possible for him or her to influence certain properties in a targeted manner, in particular the values for the leakage, the material loss and the tensile strength.

EXAMPLE 3

In the tests making up this example, the addition of thermal polyphosphoric acid to mixtures of red, fuming nitric acid and concentrated sulfuric acid with an $H_2SO_4$ concentration of 95 to 97% by weight with respect to the acid is determined. Table 3 reproduces the proportions of the reactants which were used when carrying out the tests:

TABLE 3

| liquid proportions of the reaction mixture | | | | ratio of |
|---|---|---|---|---|
| $HNO_3$ (parts by weight) | $H_2SO_4$ (parts by weight) | PPS (parts by weight) | concentration of PPS (%) | natural graphite to liquid content (parts by weight) |
| 20 | 20 | 0 | 0 | 100/40 |
| 19 | 19 | 2 | 5 | 100/40 |
| 15 | 15 | 10 | 25 | 100/40 |

PPS = thermal polyphosphoric acid

The reactants were reacted, as described under Example 1, third partial test. In addition, as described therein, expandates were produced from the graphite intercalation compounds, and graphite foils being 1 mm thick and having a bulk density of 1 g/cm$^3$ were produced from the expandates. Grade 2901 graphite from Superior Graphite, Chicago, Ill. was used as the natural graphite.

Table 4 reproduces the characteristic values established on the graphite expandates and the foils obtained therefrom:

TABLE 4

| Composition of the liquid phase (parts by weight) | natural graphite/ acid mixture (parts by weight) | bulk weight of expandate (g/l) | characteristic data of the graphite foil | | |
|---|---|---|---|---|---|
| | | | leakage (mg/ (s · m)) | mass loss (600° C.) (%/h) | tensile strength (N/mm$^2$) |
| 20 P $HNO_3$/ 20 P $H_2SO_4$ | 100/40 | 2.0 | 0.168 | 1.33 | 3.5 |
| 19 P $HNO_3$/ 19 P $H_2SO_4$/ 2 P PPS | 100/40 | 1.9 | 0.102 | 0.64 | 3.35 |
| 15 P $HNO_3$/ 15 P $H_2SO_4$/ 10 P PPS | 100/40 | 1.8 | 0.033 | 0.76 | 3.25 |

PPS = thermal polyphosphoric acid
P = parts by weight

It can be gathered from the measured values of Table 4 that even an addition of thermal polyphosphoric acid to an intercalation mixture which is formed of a mixture of nitric acid and concentrated sulfuric acid is very advantageous and leads to a considerable improvement in the leakage values and the mass loss of the graphite foils produced from the corresponding intercalation compound. In accordance with the overall good values for the bulk weight of the expandate, the values for the tensile strength lie at a high level. The compressive strengths, which are not given in the table, are comparatively widely scattered. The average value is in the region of 140 MPa and thus at an average level. Even without the addition of polyphosphoric acid, the bulk weight of the expandate is already very low. Therefore, the improvement to even lower values that was effected by the addition of the polyphosphoric acid could only slightly drop.

EXAMPLE 4

In the tests making up this example, the addition of thermal polyphosphoric acid to mixtures of concentrated sulfuric acid with an $H_2SO_4$ concentration of 95 to 97% by weight with respect to the acid and a solution of hydrogen peroxide with an $H_2O_2$ content of 85% by weight in the solution (supplier Merck AG, Germany) is examined. Table 5 reproduces the proportions of the reactants which were used when carrying out the tests:

TABLE 5

| liquid proportions of the reaction mixture | | | | ratio of |
|---|---|---|---|---|
| $H_2SO_4$ (parts by weight) | $H_2O_2$ solution (parts by weight) | PPS (parts by weight) | concentration of PPS (%) | natural graphite to liquid content (parts by weight) |
| 36 | 4 | 0 | 0 | 100/40 |
| 27 | 3 | 10 | 25 | 100/40 |

PPS = thermal polyphosphoric acid

The reactants were reacted as described under Example 1, third partial test. As described therein, expandates were produced from the graphite intercalation compounds, and graphite foils being 1 mm thick and having a bulk density of 1 g/cm$^3$ were produced from the expandates. Grade 2901 graphite from the company Superior Graphite, Chicago, Ill. was used as the natural graphite.

Table 6 reproduces the characteristic values established for the graphite expandates and the foils obtained therefrom:

TABLE 6

| Composition of the liquid phase (parts by weight) | natural graphite/ acid mixture (parts by weight) | Bulk weight of expandate (g/l) | characteristic data of the graphite foil | | |
|---|---|---|---|---|---|
| | | | leakage (mg/ (s · m)) | mass loss (600° C.) (%/h) | tensile strength (N/mm$^2$) |
| 36 P $H_2SO_4$/ 4 P $H_2O_2$ | 100/40 | 3.4 | 0.186 | 1.64 | 2.1 |
| 27 P $H_2SO_4$/ 3 P $H_2O_2$/ 10 P PPS | 100/40 | 3.0 | 0.045 | 1.17 | 1.9 |

PPS = thermal polyphosphoric acid
P = parts by weight

The characteristic data which can be taken from Table 6 likewise shows that even in the case of an intercalation mixture of concentrated sulfuric acid and a hydrogen peroxide solution, an addition of thermal polyphosphoric acid has an advantageous effect. Very positive effects on the leakage behavior and on the mass loss as a measure for the resistance to oxidative attack can also be seen herein. Although the bulk densities of the expandates are comparatively high, the addition of polyphosphoric acid effects a gradual improvement. The values for the tensile strength are low, in accordance with the high bulk densities. However, at 160 MPa for the control foil and at 170 MPa for the test foil, the non-illustrated values for the compressive strengths with PPS addition are accordingly advantageously high.

EXAMPLE 5

In the tests making up this example, the use of two thermal polyphosphoric acids, namely an acid having a calculated content of phosphorus pentoxide of 76% by weight and an acid having a calculated content of 84% by weight, in each case in a mixture with red, fuming nitric acid as intercalation medium, are compared. Table 7 reproduces the proportions of the reactants which were used when the tests were carried out:

TABLE 7

| Concentration of the PPS Percent $P_2O_5$ Calculated | liquid proportions of the reaction mixture | | | ratio of natural graphite to liquid content (parts by weight) |
|---|---|---|---|---|
| | $HNO_3$ (parts by weight) | PPS (parts by weight) | concentration of PPS (%) | |
| | 100 | 0 | 0 | 100/40 |
| 76 | 38 | 2 | 5 | 100/40 |
| 84 | 38 | 2 | 5 | 100/40 |

PPS = thermal polyphosphoric acid

The reactants were reacted, as described under Example 1, third partial test. As described therein, expandates were produced from the graphite intercalation compounds, and graphite foils being 1 mm thick and having a bulk density of 1 g/cm³ were produced from the expandates. Grade 2901 graphite from the company Superior Graphite, Chicago, Ill. was used as the natural graphite.

Table 8 reproduces the characteristic values established on the graphite expandates and the foils obtained therefrom:

TABLE 8

| Composition of the liquid phase (parts by weight) | natural graphite/ acid mixture (parts by weight) | Bulk weight of expan- date (g/l) | characteristic data of the graphite foil | | |
|---|---|---|---|---|---|
| | | | leakage (mg/ (s · m)) | mass loss (600° C.) (%/h) | tensile strength (N/mm²) |
| 100 P $HNO_3$ | 100/40 | 2.9 | 0.124 | 1.81 | 3.02 |
| 38 P $HNO_3$/2 P PPS, 76% by weight, calc., $P_2O_5$ | 100/40 | 2.7 | 0.109 | 0.69 | 2.9 |
| 38 P $HNO_3$/2 P PPS, 84% by weight, calc., $P_2O_5$ | 100/40 | 2.1 | 0.073 | 0.60 | 3.56 |

PPS = thermal polyphosphoric acid
P = parts by weight

It emerges from the measured values of Table 8 that even when a thermal polyphosphoric acid having a calculated content of only 76% by weight phosphorus pentoxide is used, in comparison with the use of red, fuming nitric acid without an addition of thermal polyphosphoric acid, products with considerably improved properties are obtained to some extent. Only the tensile strength lies in accordance with the comparatively high bulk weight in the range of the control sample without an addition of polyphosphoric acid. A further significant improvement in the properties is achieved as a result of the use of thermal polyphosphoric acid having a calculated content of 84% by weight phosphorus pentoxide.

When looking at all of the results of Examples 1 to 5 carried out on a laboratory scale, it is seen that as a result of an addition of thermal polyphosphoric acid to liquid, acidic intercalation agents, graphite intercalation compounds can be produced from which expanded graphites and, by further processing of these graphite expandates, graphite molded bodies and in particular graphite foils, graphite plates and graphite laminates having considerably improved leakage behavior and greatly increased resistance to oxidative attack, can be produced. Moreover, by exploiting the teaching of the invention, a way of controlling the improvement of the properties is available to the skilled person. He or she can also produce either graphite products with improved tensile strength or with improved compressive strength. However, those products both have an improved fluid tightness and a comparatively great resistance to oxidative attack.

EXAMPLE 6

Large or Commercial Scale

The method in accordance with the invention was accordingly tested further in a pilot plant in the context of large-scale tests with red, fuming nitric acid and thermal polyphosphoric acid having a calculated content of phosphorus pentoxide of 84% by weight. The proportion of intercalation liquid in the reaction mixture amounted to 33% by weight with respect to the amount of graphite being used. In each partial test, 100 kg of grade 599 thermally purified natural graphite, supplier Luoyang Guanqi Factory Group Co., Ltd., Luoyang City/China was used. The intercalation reactions were carried out at room temperature of approximately 22° C. The expanding of the mixture of the graphite intercalation compound and adhering intercalation liquid, in which the mixture had reacted fully after an average residence time of 15 minutes, took place by blowing through the flame of a natural gas burner. The particles of the intercalation compound were thereby heated within fractions of seconds to a temperature of approximately 1000° C. The graphite expandate obtained thereby was compressed by way of a strip pre-compressor and a plurality of roller frames to form graphite foils having a thickness of 0.5 mm and a bulk density of 0.7 g/cm³. Two heating stations were disposed between the strip pre-compressor and the first two roller frames. The partially compressed foil strip was again heated to 600° C. in the two heating stations in order to remove residues of trapped evaporable substances. The amounts of added intercalation agent, the respective composition thereof and the characteristic data of the foils produced with these tests are to be found in Table 9. When measuring the leakage values, 4 test seals having an initial thickness of 0.5 mm were placed one on top of the other. Apart from this, the leakage rate given in Table 9, unlike the leakage rates given in the previous examples, has been related by calculation to a weight per unit area of the test body of 2000 g/m².

TABLE 9

| Composition of the liquid phase (parts by weight) | | | characteristic data of the graphite foil | | | |
|---|---|---|---|---|---|---|
| | natural graphite/ acid | | | Leakage with respect to weight per unit area | | |
| HNO₃ (parts by weight) | PPS (parts by weight) | mixture (parts by weight) | Bulk weight of expandate (g/l) | 2000 g/m² (mg/ (s · m)) | loss (600 °C.) (%/h) | tensile strength (N/mm²) |
| 33 | 0 | 100/33 | 2.5 | 0.25–0.30 | 20.5 | 2.5 |
| 32.7 | 0.3 | 100/33 | 2.0 | 0.18–0.22 | 1.1 | 2.8 |
| 31.3 | 1.7 | 100/33 | 1.9 | 0.08–0.10 | 0.3 | 2.8 |
| 29.7 | 3.3 | 100/33 | 1.8 | 0.05–0.06 | 0.7 | 3.0 |
| 26.4 | 6.6 | 100/33 | 1.8 | 0.04–0.05 | 0.7 | 3.0 |

PPS = thermal polyphosphoric acid

It follows from the values of Table 9 that the method according to the invention can also be used successfully on a large or commercial scale. The characteristic data which demonstrate the improvements in accordance with the invention are even more favorable than in Examples 1 to 5 which were carried out on a laboratory scale. In particular, it emerges from this that according to the method, with an addition of at least 10 parts by weight of thermal polyphosphoric acid with respect to the liquid, acidic intercalation agent, graphite seals can be produced having a tightness which, expressed by the leakage rate for nitrogen in the case of excellent oxidation resistance, amounts to at most 0.06 mg/(s·m) and thus goes beyond that which was possible in the prior art until now. These graphite foils and seals have strength properties which are without exception and are excellent for their use for high-quality seals.

In summary, the invention has the following advantages:

Improvement in the fluid tightness of graphite products such as foils, plates, laminates, seals;

Improvement in the resistance of the above-mentioned graphite products to oxidative attack;

Possibility of controlling the tensile strength and compressive strength of the graphite products produced according to the method while retaining the above-mentioned advantages with respect to the fluid tightness and the oxidation resistance, and in that case at least one of the above-mentioned resistance values is greater than in products produced according to the prior art;

No introduction of cations, which act as oxidation transporters, into the graphite products, in the method;

Applicability of the method to the various technically applicable liquid intercalation agents;

Improvement of the course of the reaction when using concentrated nitric acid as intercalation agent;

Avoidance of the difficulties and disadvantages encountered when working with phosphorus pentoxide.

We claim:

1. A method for producing an expandable graphite intercalation compound, which comprises:
reacting crystalline graphite particles having a lamellar structure, in a temperature range from −10° C. to +80° C., without an additional supply of water, with a reaction mixture formed of at least one strong concentrated acid selected from the group consisting of sulfuric acid and nitric acid, an oxidizing agent selected from the group consisting of concentrated nitric acid, hydrogen peroxide and peroxo sulfuric acid for oxidizing the graphite, and a thermal polyphosphoric acid, and avoiding any contact of the graphite compound reaction product with water, producing an expandable graphite compound with a bulk weight of at most 3 g/l.

2. The method according to claim 1, wherein the thermal polyphosphoric acid in the reaction mixture has a calculated phosphorus pentoxide content of at least 76% by weight.

3. The method according to claim 1, wherein the thermal polyphosphoric acid in the reaction mixture has a calculated phosphorus pentoxide content of at least 84% by weight.

4. The method according to claim 1, which further comprises mixing a sum of the acid and the oxidizing agent, with the thermal polyphosphoric acid, in a mixing ratio range of from 1:0.002 to 1:1.0 parts by weight.

5. The method according to claim 1, which further comprises mixing a sum of the acid and the oxidizing agent, with the thermal polyphosphoric acid, in a mixing ratio range of from 1:0.005 to 1:0.1 parts by weight.

6. The method according to claim 1, which further comprises mixing a sum of the acid and the oxidizing agent, with the thermal polyphosphoric acid, in a mixing ratio range of from 1:0.005 to 1:0.03 parts by weight.

7. The method according to claim 1, which further comprises mixing the acid, the thermal polyphosphoric acid and the oxidizing agent in a ratio range of from 10 to 200 parts by weight relative to 100 parts by weight of the graphite.

8. The method according to claim 1, which further comprises separating excess liquid from the reaction mixture after the intercalation reaction ends.

9. The method according to claim 8, which further comprises expanding residual matter formed of the expandable graphite intercalation compound by rapid heating to at least 500° C.

10. The method according to claim 8, which further comprises expanding residual matter formed of the expandable graphite intercalation compound by rapid heating to at least 800° C.

11. The method according to claim 1, which further comprises mixing the acid, the thermal polyphosphoric acid and the oxidizing agent in a ratio range of from 20 to 50 parts by weight relative to 100 parts by weight of the graphite.

12. The method according to claim 11, which further comprises expanding the reaction mixture as is by rapid heating to at least 500° C. after the intercalation reaction ends.

13. The method according to claim 11, which further comprises processing the reaction mixture as is by rapid heating to at least 800° C. after the intercalation reaction ends.

14. The method according to claim 1, which further comprises carrying out the step of reacting the graphite particles with the reaction mixture by providing at least highly concentrated nitric acid and thermal polyphosphoric acid as the reaction mixture.

15. The method according to claim 14, which further comprises using red, fuming nitric acid as the nitric acid.

16. The method according to claim 14, which further comprises carrying out the reacting step with the thermal polyphosphoric acid having a calculated phosphorus pentoxide content of at least 76% by weight.

17. The method according to claim 14, which further comprises carrying out the reaction with a thermal polyphosphoric acid having a calculated phosphorus pentoxide content of at least 84% by weight.

18. The method according to claim 14, which further comprises mixing the nitric acid and the thermal polyphosphoric acid in a mixing ratio range of from 1:0.002 to 1:1.0 parts by weight.

19. The method according to claim 14, which further comprises mixing the nitric acid and the thermal polyphosphoric acid in a mixing ratio range of from 1:0.005 to 1:0.25 parts by weight.

20. The method according to claim 14, which further comprises mixing the nitric acid and the thermal polyphosphoric acid in a mixing ratio range of from 1:0.005 to 1:0.1 parts by weight.

21. The method according to claim 14, which further comprises mixing the nitric acid and the thermal polyphosphoric acid in a mixing ratio range of from 1:0.005 to 1:0.03 parts by weight.

22. The method according to claim 14, which further comprises forming the mixture substantially of the nitric acid and the thermal polyphosphoric acid in a ratio range of from 10 to 200 parts by weight relative to 100 parts by weight of the graphite.

23. The method according to claim 14, which further comprises separating excess liquid from the reaction mixture after the intercalation reaction ends.

24. The method according to claim 23, which further comprises expanding residual matter formed of the expandable graphite intercalation compound by rapid heating to at least 500° C.

25. The method according to claim 14, which further comprises forming the mixture of the nitric acid and the thermal polyphosphoric acid in a ratio range of from 20 to 50 parts by weight relative to 100 parts by weight of the graphite.

26. The method according to claim 25, which further comprises expanding the reaction mixture as is by rapid heating to at least 500° C. after the intercalation reaction ends.

27. The method according to claim 25, which further comprises expanding the reaction mixture as is by rapid heating to at least 800° C. after the intercalation reaction ends.

28. The method according to claim 9, which further comprises producing products from the group consisting of graphite foils, graphite laminates, graphite seals, graphite packings, graphite packing rings and graphite packing yarns, from the expanded graphite.

29. The method according to claim 10, which further comprises producing products from the group consisting of graphite foils, graphite laminates, graphite seals, graphite packings, graphite packing rings and graphite packing yarns, from the expanded graphite.

30. The method according to claim 12, which further comprises producing products from the group consisting of graphite foils, graphite laminates, graphite seals, graphite packings, graphite packing rings and graphite packing yarns, from the expanded graphite.

31. The method according to claim 13, which further comprises producing products from the group consisting of graphite foils, graphite laminates, graphite seals, graphite packings, graphite packing rings and graphite packing yarns, from the expanded graphite.

32. The method according to claim 24, which further comprises producing products from the group consisting of graphite foils, graphite laminates, graphite seals, graphite packings, graphite packing rings and graphite packing yarns, from the expanded graphite.

33. The method according to claim 26, which further comprises producing products from the group consisting of graphite foils, graphite laminates, graphite seals, graphite packings, graphite packing rings and graphite packing yarns, from the expanded graphite.

34. The method according to claim 27, which further comprises producing products from the group consisting of graphite foils, graphite laminates, graphite seals, graphite packings, graphite packing rings and graphite packing yarns, from the expanded graphite.

35. The method according to claim 23, which further comprises producing products from the group consisting of graphite foils, graphite laminates, graphite seals, graphite packings, graphite packing rings and graphite packing yarns, from the expanded graphite.

36. A graphite foil, comprising:
a compressed expanded graphite produced according to claim 24, having a gas permeability for nitrogen in accordance with DIN 28090-1 (preliminary test) of at most 0.06 mg/(m·s), with respect to a graphite weight per unit area of 2000 g/m$^2$.

37. A graphite foil, comprising:
a compressed expanded graphite produced according to claim 26, having a gas permeability for nitrogen in accordance with DIN 28090-1 (preliminary test) of at most 0.06 mg/(m·s), with respect to a graphite weight per unit area of 2000 g/m$^2$.

38. A graphite foil, comprising:
a compressed expanded graphite produced according to claim 27, having a gas permeability for nitrogen in accordance with DIN 28090-1 (preliminary test) of at most 0.06 mg/(m·s), with respect to a graphite weight per unit area of 2000 g/m$^2$.

39. A graphite foil, comprising:
a compressed expanded graphite produced according to claim 27, having a gas permeability for nitrogen in accordance with DIN 28090-1 (preliminary test) of at most 0.06 mg/(m·s), with respect to a graphite weight per unit area of 2000 g/m$^2$.

\* \* \* \* \*